United States Patent
Yrjänäinen et al.

(10) Patent No.: US 7,136,048 B2
(45) Date of Patent: Nov. 14, 2006

(54) ELECTRICALLY ERASABLE WRITING SURFACE

(75) Inventors: Jukka Yrjänäinen, Ylöjärvi (FI); Jukka Hautanen, Tampere (FI); Jari A. Kangas, Tampere (FI)

(73) Assignee: Nokia Corporation, Espoo (FI)

( * ) Notice: Subject to any disclaimer, the term of this patent is extended or adjusted under 35 U.S.C. 154(b) by 70 days.

(21) Appl. No.: 10/078,684

(22) Filed: Feb. 19, 2002

(65) Prior Publication Data
US 2003/0156099 A1    Aug. 21, 2003

(51) Int. Cl.
*G09G 5/00* (2006.01)

(52) U.S. Cl. .................................... 345/173; 178/18.03

(58) Field of Classification Search .............. 345/173, 345/175, 174, 177; 178/18.03–18.06, 19.24
See application file for complete search history.

(56) References Cited

U.S. PATENT DOCUMENTS

| | | | |
|---|---|---|---|
| 4,172,333 A * | 10/1979 | Towsend | 40/544 |
| 4,700,022 A | 10/1987 | Salvador et al. | |
| 4,730,186 A * | 3/1988 | Koga et al. | 345/179 |
| 5,031,119 A | 7/1991 | Dulaney et al. | |
| 5,119,079 A | 6/1992 | Hube et al. | |
| 5,398,276 A | 3/1995 | Lemke et al. | |
| 5,545,857 A | 8/1996 | Lee et al. | |
| 5,579,487 A * | 11/1996 | Meyerson et al. | 710/100 |
| 5,584,054 A | 12/1996 | Tyneski et al. | |
| 5,594,470 A | 1/1997 | Meyerson et al. | |
| 5,596,350 A | 1/1997 | Capps et al. | |
| 5,715,524 A | 2/1998 | Jambhekar et al. | |
| 5,742,894 A | 4/1998 | Jambhekar et al. | |
| 5,748,185 A | 5/1998 | Stephan et al. | |
| 5,761,485 A | 6/1998 | Munyan | |
| 5,778,404 A | 7/1998 | Capps et al. | |
| 5,867,688 A | 2/1999 | Simmon et al. | |
| 5,949,501 A * | 9/1999 | Izuno et al. | 349/23 |
| 6,104,448 A | 8/2000 | Doane et al. | |
| 6,215,475 B1 | 4/2001 | Meyerson et al. | |
| 6,266,045 B1 | 7/2001 | Myerson et al. | |
| 6,756,970 B1 * | 6/2004 | Keely et al. | 345/173 |

OTHER PUBLICATIONS

Website: www.elotouch.com.
Website: www.gunze-ny.com.
Website: www.smk.co.jp.

* cited by examiner

*Primary Examiner*—Jimmy H. Nguyen
(74) *Attorney, Agent, or Firm*—Banner & Witcoff (57) ABSTRACT

An electrically erasable writing surface is provided. The writing surface includes a bistable display layer that responds to electrical and mechanical inputs. A touch pad is located above or below the display layer. The writing surface facilitates writing complex characters and increases accuracy by displaying a user input created by a passive stylus.

28 Claims, 6 Drawing Sheets

ELECTRICALLY ERASABLE WRITING SURFACE

FIELD OF THE INVENTION

The invention relates to pressure sensitive input devices. More particularly, the invention provides a mechanically and electrically addressable writing surface that incorporates a bistable display layer that retains an optical state until electrically erased.

BACKGROUND OF THE INVENTION

Pressure sensitive touch pads are commonly used with personal digital assistants (PDAs) and other portable electronic devices. Pressure sensitive touch pads convert mechanical pressure, typically applied by a stylus, into an electrical output. The stylus is typically used to enter characters or make menu selections. Many conventional touch pads do not include a display that traces (i.e., shows) the path of the stylus. As a result, it can be difficult for users to accurately use a stylus to input character data. This is particularly a problem with complex characters, such as characters that are a part of oriental languages. As the accuracy of the input data decreases, so does the accuracy of the output electrical data.

One approach to displaying the path traced by a stylus includes the use of an active stylus. An active stylus generates an electric or magnetic field and changes the state of a display placed over a touch pad. One of the disadvantages of using an active stylus is that an active stylus cannot be interchanged with other styluses. Another disadvantage is that active styluses that include electrical components are expensive, when compared with passive styluses.

Electrically addressable displays have also been placed over touch pads to display the path traced by a stylus. Information detected by the touch pad is transmitted to a display driver circuit. The display driver circuit energizes patterned display electrodes and causes the display to display the path traced by the stylus. Display driver circuits increase the size and expense of the device. Another drawback to devices that include electrically addressable displays placed over touch pads is that such devices require frequent and inconvenient calibration steps in order to keep the trace generated by the display aligned with the actual position of the stylus.

Therefore, there exists a need in the art for a pressure sensitive input device that displays the trace of a stylus without the use of an active stylus or complex driver circuits.

SUMMARY OF THE INVENTION

One or more of the above-mentioned needs in the art are satisfied by the disclosed systems and methods that include a mechanically and electrically addressable writing surface that incorporates a bistable display layer that retains an optical state until electrically erased. The writing surface provides immediate feedback to a user and facilitates the writing of characters. The bistable display layer increases efficiency by only consuming electrical power when resetting the state of the display layer.

A first embodiment of the invention provides a writing surface. The writing surface includes a display layer comprising electrically and mechanically sensitive display material having at least two stable optical states. A touch pad is physically coupled to the display layer. The touch pad is configured to convert a mechanical input into an electrical output.

In another embodiment, a user interface for use with an electronic device is provided. The user interface includes an optical output section and a mechanical input section. The mechanical input section includes a display layer comprising electrically and mechanically sensitive display material having at least two stable optical states. A touch pad is physically coupled to the display layer. The touch pad is configured to convert a mechanical input into an electrical output. The user interface may be used with a mobile terminal.

In yet another embodiment of the invention, a method of operating an input device is provided. The input device includes an electrically and mechanically sensitive display layer having at least two stable optical states and physically coupled to a touch pad. The method includes (a) receiving at the display layer and the touch pad a mechanical input. In response to (a) an optical state of the display layer is changed and, at the touch pad, the physical input is converted to an electrical output.

In other embodiments of the invention, computer-executable instructions for implementing the disclosed methods are stored on computer-readable media.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
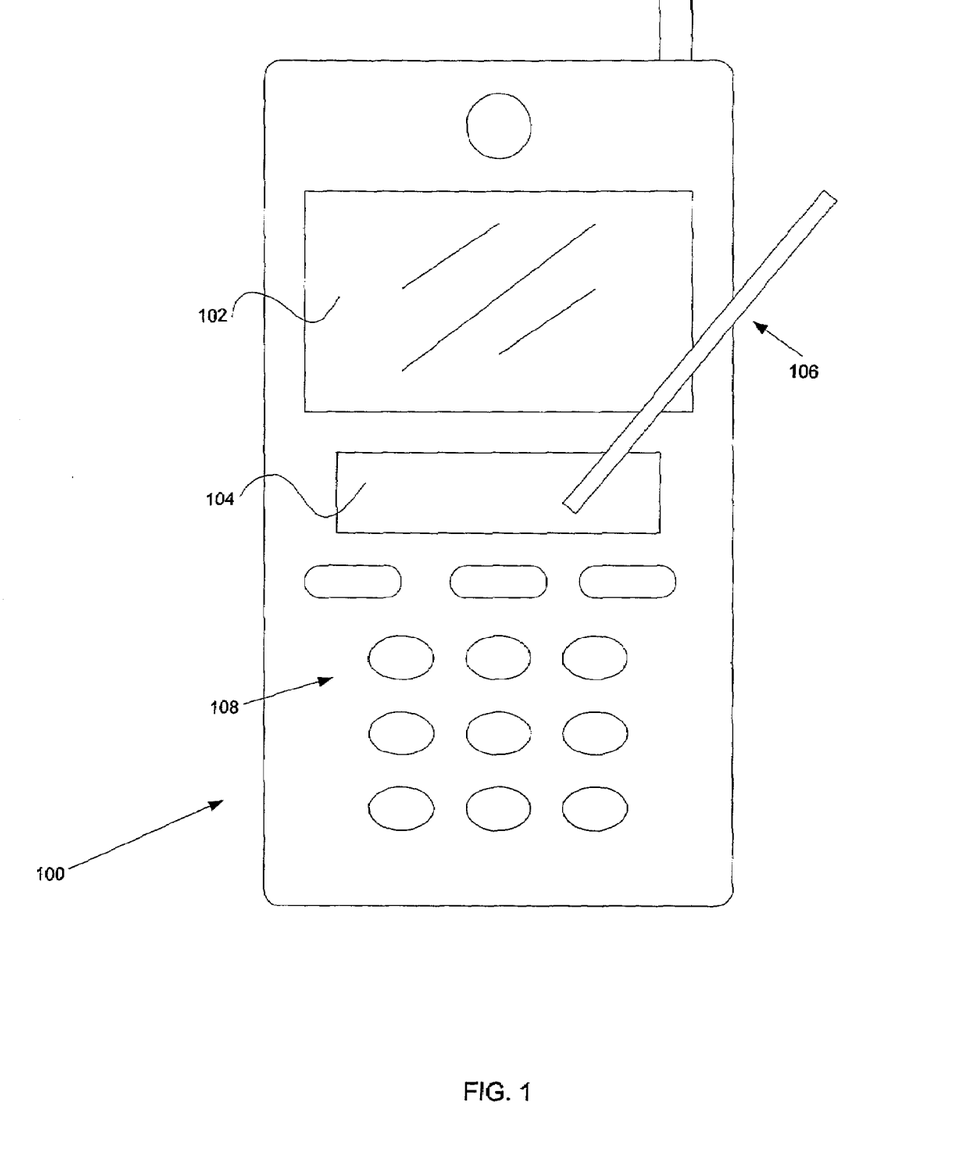
FIG. 1 shows a portable electronic device that incorporates a writing surface in accordance with an embodiment of the invention.

FIG. 1 illustrates a portable electronic device such as a mobile terminal 100 in accordance with an embodiment of the invention. Mobile terminal 100 includes an optical output section 102 that may be used to display information to a user. Optical output section 102 may be implemented with a liquid crystal display or any other conventional flat-panel display conventionally used with portable electronic devices. A user of mobile terminal 100 may enter information with a mechanical input section 104 and/or a keypad section 108. Mechanical input section 104 may include a mechanically and electrically addressable writing surface that includes a bistable display layer. U.S. Pat. No. 6,104,448 to Doane et al. discloses an exemplary mechanically and electrically addressable display material that may be used to create a display layer. The bistable display layer is mechanically coupled to and positioned in an overlapping relationship with a touch pad. Keypad 108 may include a variety of alphanumeric keys, function keys or other keys typically found in portable electronic devices. When entering data, a user may utilize mechanical input section 104 or keypad 108. Because of the increased accuracy provided by mechanical input section 104 when compared to prior art devices, users may find it convenient to use mechanical input section 104 for inputting a greater number of characters. As a result, the number of characters represented by keypad 108 may be reduced and the overall size of mobile terminal may be reduced.

Figure 2:
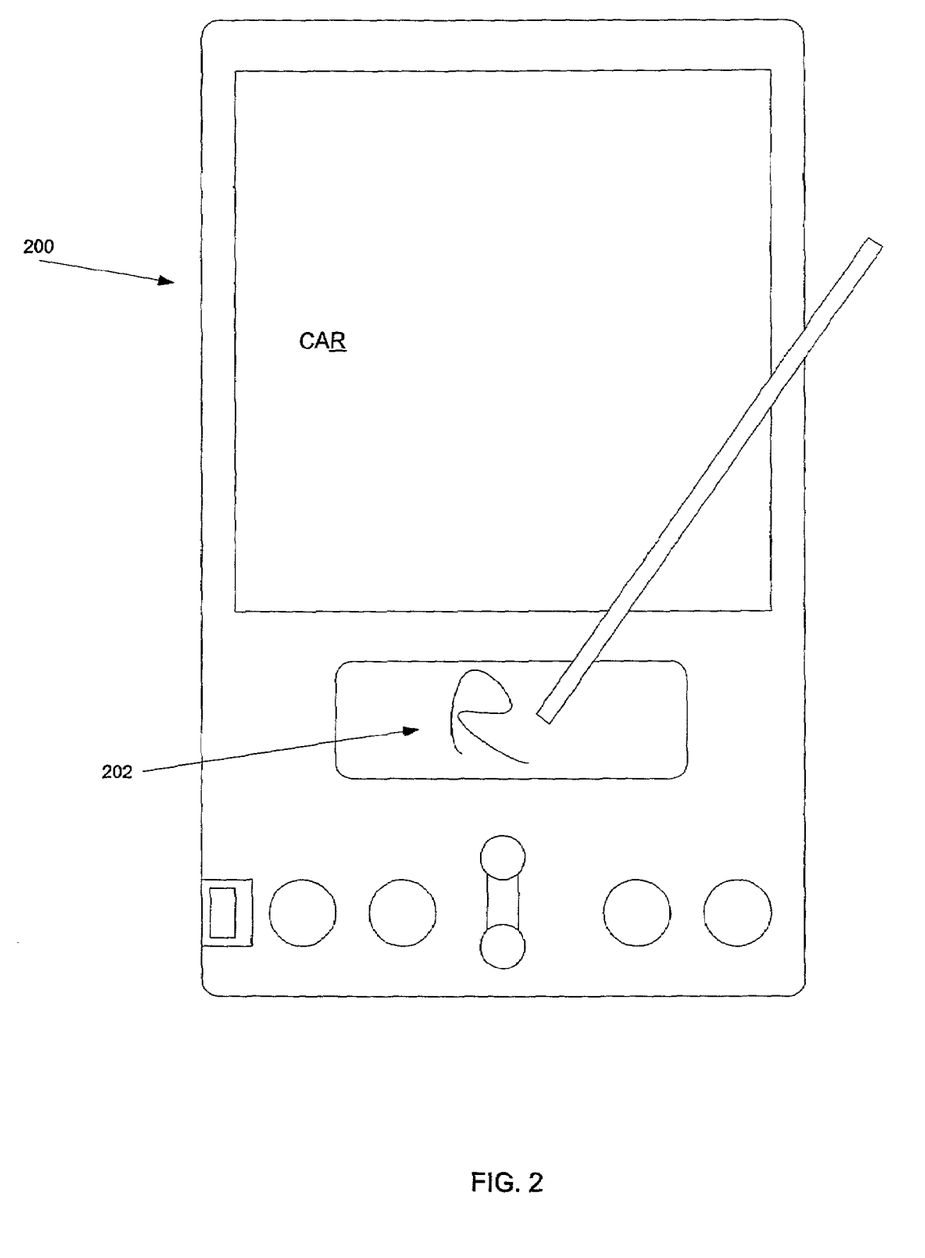
FIG. 2 shows another portable electronic device that incorporates a writing surface in accordance with an embodiment of the invention.

One skilled in the art will appreciate that aspects of the present invention, including the disclosed writing surfaces, may be used with a variety of electronic devices. FIG. 2, for example, shows a personal digital assistant 200 that incorporates a mechanically and electrically addressable writing surface 202 that includes a bistable display layer. Moreover, personal digital assistant 200 shows that in some embodiments, the disclosed writing surface may be incorporated into devices that do not include a keypad. In other embodiments of the invention, a mechanically and electrically addressable writing surface that includes a bistable display layer may be used to create a scratch pad or whiteboard.

Figure 3:
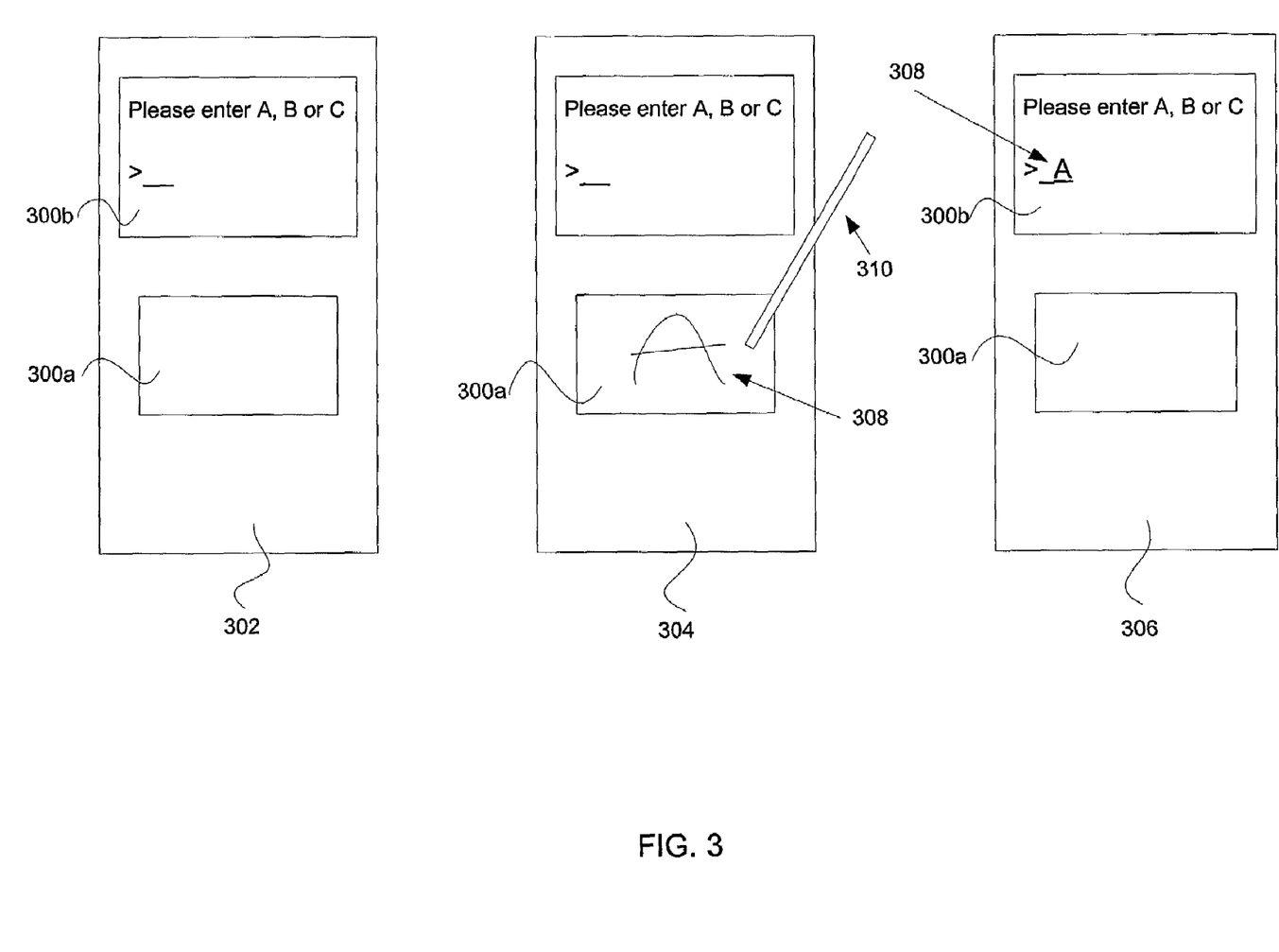
FIG. 3 illustrates an operation of a writing surface in accordance with an embodiment of the invention.

An example of the operation of mobile terminal 100 and personal digital assistant 200 is illustrated in FIG. 3. FIG. 3 shows a device that prompts a user to enter a character. In a first state 302, the device electrically erases any information on the contents of a writing surface 300a and displays information to the user on display 300b. As described below, writing surface 300b may be erased by applying an electric or magnetic field to a bistable display layer. In a second state 304, a user enters a character 308 on writing surface 300a with a stylus 310. The entered character is displayed on writing surface 300a in response to mechanical pressure applied by stylus 310. The bistable display layer displays the character without any further mechanical or electrical input. That is, the state of writing surface 300b is stable. The device may use a handwriting recognition module to recognize the character written on writing surface 300a.

The final device state 306, shows that the device has recognized the written character, displayed the character on display 300b and erased writing surface 300a. The bistable display layer provides flexibility to developers and users and allows writing surface 300a to be erased at a variety of different times. For example, writing surface 300a may be erased after the character is recognized by a handwriting recognition module, after a predetermined time period, after a command from the user or at any other time.

Figure 4:
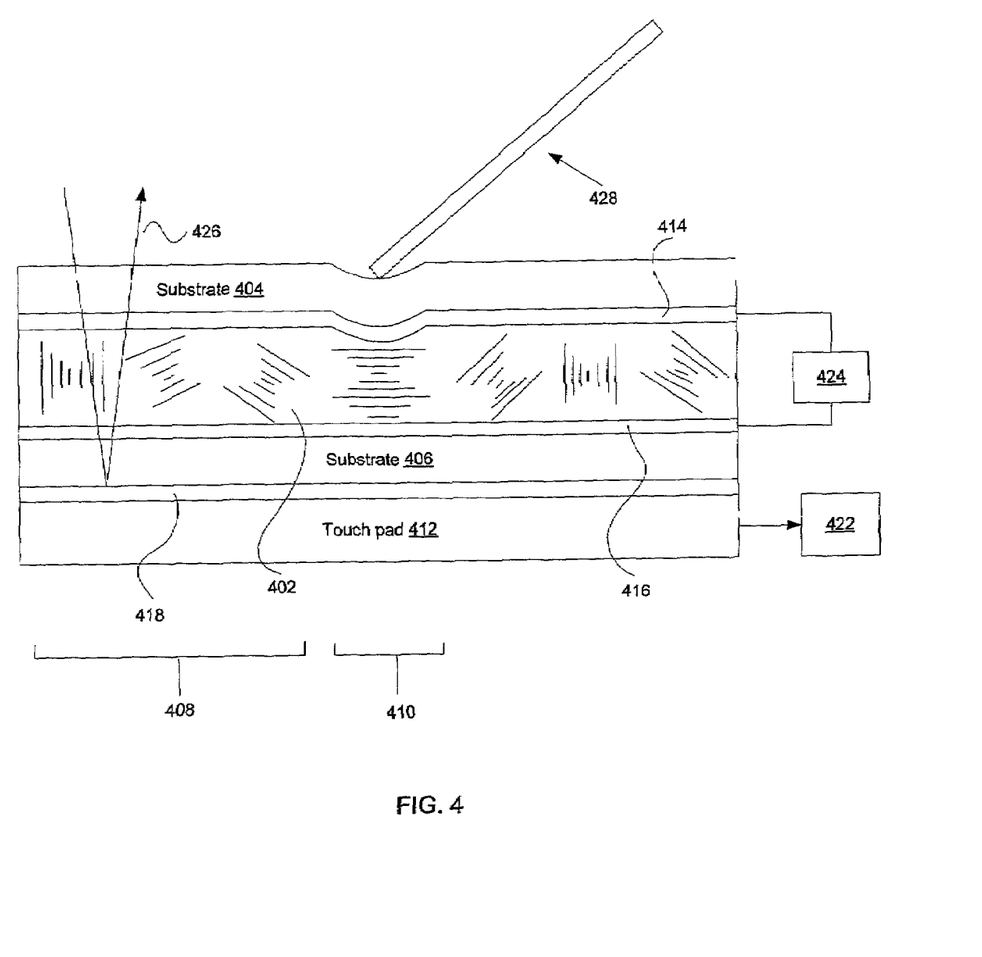
FIG. 4 illustrates a structure of a writing surface in accordance with an embodiment of the invention.

FIG. 4 illustrates a writing surface, in accordance with an embodiment of the invention. A display layer 402 is held between two substrates 404 and 406. Display layer 402 includes an electrically and mechanically sensitive display material having at least two stable optical states. A display material is electrically and mechanically sensitive when the display layer can change optical states in response to both an electrical field and to a mechanical input, such as a pressure source. As used herein, an optical state is stable when the display material maintains the optical state without the application of an excitation source for at least several seconds. Optical states may include transparent, blocking and reflective. Examples of electrically and mechanically sensitive display materials having at least two stable optical states include: cholesteric liquid crystal material, twisted nematic liquid crystal material and suspended particle display materials. Display layer 402 may include a polymer dispersed throughout the display layer to aid in stabilizing the optical states.

The embodiment of display layer 402 shown in FIG. 4 includes cholesteric liquid crystal material. Region 408 includes cholesteric liquid crystal material having helical axes aligned at random angles. When helical axes are aligned at random angles, the material is in a transparent optical state. Region 410, corresponding to a region that has been mechanically stimulated by stylus 428, includes cholesteric liquid crystal material having helical axes aligned essentially orthogonal to substrates 404 and 406. The material in region 410 reflects incident light having a predetermined wavelength. As is well known in the art, the wavelength $\lambda$ of the light reflected light is determined by $\lambda=np$, where n=the refractive index of the liquid crystal material and p=the pitch length of the liquid crystal material.

Substrate 404 may be a transparent and flexible material, such as glass or plastic. In one embodiment, substrate 406 is also transparent and flexible. In embodiments in which a touch pad is formed above substrate 404, substrate 406 need not be flexible.

A pair of electrodes 414 and 416 may be used to apply an electric or magnetic field to display layer 402. Top electrode 414 may be formed of a transparent material, such as indium-tin oxide. Bottom electrode 416 may also be formed of a transparent material. In reflective embodiments (not shown), electrode 416 may be formed of a reflective material, such as silver or aluminum. Alternatively, in reflective embodiments, an additional reflective layer may be included. Electrodes 414 and 416 may be sheet electrodes used to apply a field to the entire display layer and need not be patterned electrodes used to address individual pixels. Of course, patterned electrodes may be used and the patterned electrodes may be addressed at the same time.

A pigment layer 418 may be attached to substrate 406. Pigment layer 418 may be implemented with a black layer or a colored material. In one embodiment, pigment layer 418 has a color complimentary to the color of light reflected by display layer 402. A touch pad 412 may be coupled below substrate 406 or above substrate 404. Touch pad 412 may be implemented with a conventional grid of electrodes that convert a mechanical input into an electrical output. Touch pad 412 generates an electrical output from a mechanical input and may transmit an electrical output signal to a processor 422. Of course, when touch pad 412 is positioned above substrate 404, touch pad 412 may be transparent and flexible.

The operation of the writing surface shown in FIG. 4 will now be described. A reset module 424 applies an electric field to display layer 402. The application of an electric field causes the helical axes of the cholesteric liquid crystal material display layer 402 to align at random angles and assume a transparent state. Light ray 426, for example, travels through the transparent material and is reflected by pigment layer 418. Light ray 426 then leaves pigment layer 418 and is transmitted back to a user. When pressure is applied to display layer 402, such as by pressing on substrate 404 with a stylus 428, the mechanical pressure causes the helical axes of the depressed portions of the cholesteric liquid crystal material to become aligned essentially orthogonal to substrates 404 and 406. Regions of display layer 402 that have helical axes aligned essentially orthogonal with substrates 404 and 406 reflect light having the wavelength describe above.

After the removal of the mechanical pressure applied by stylus 428, the optical state of display layer 402 remains stable. The entire display layer may be reset to a transparent state by applying an electric or magnetic field with reset module 424.

One skilled in the art will appreciate that several other display materials and configurations may be used to implement aspects of the pressure invention. For example, a writing surface may have stable light blocking and transparent states. Moreover, a display material that selectively rotates light in response to an electrical or mechanical stimulus may be used in connection with one or more linear polarizers. Other conventional layers and films may also be added without departing from the inventive principals.

Figure 5:
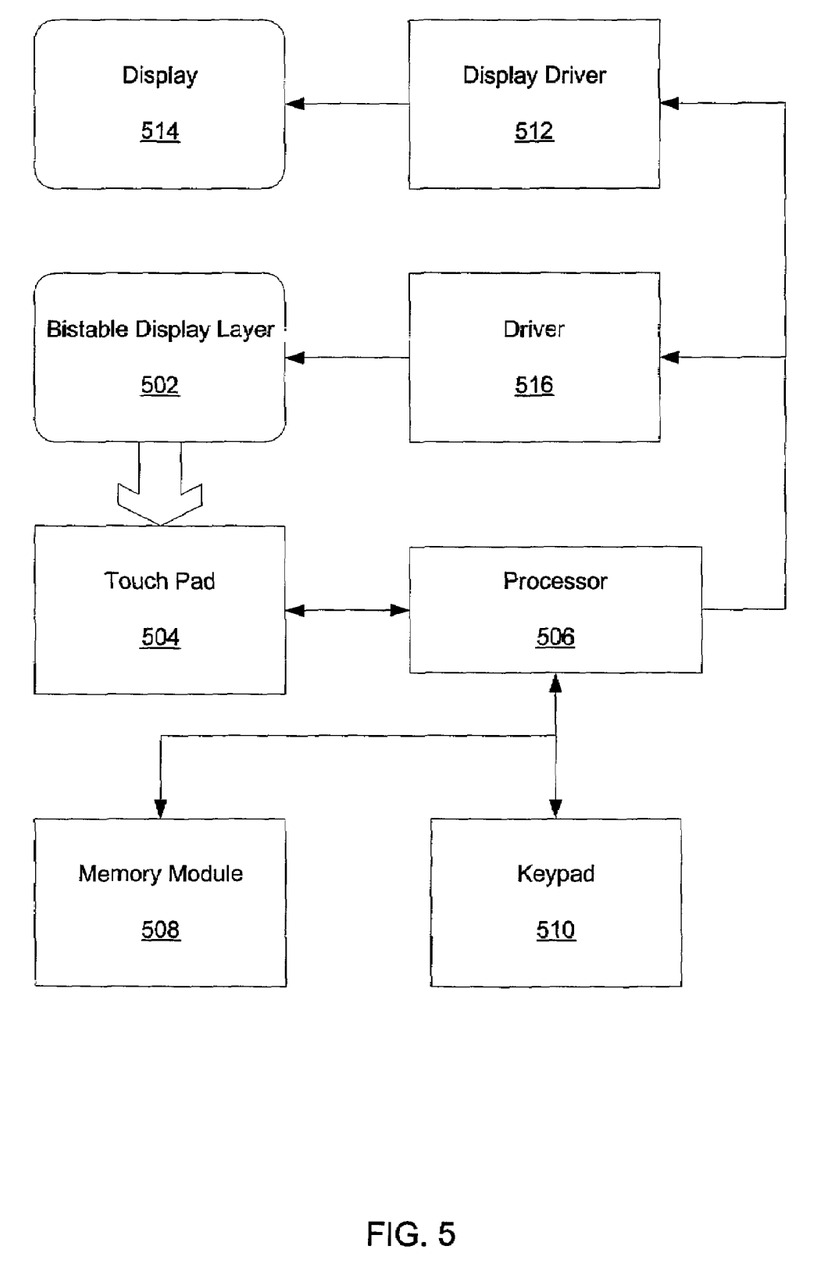
FIG. 5 shows a schematic diagram of an electronic device that incorporates a writing surface in accordance with an embodiment of the invention.

FIG. 5 illustrates a schematic diagram of a mobile terminal, personal digital assistant or other electronic device that incorporates the disclosed writing surface. A bistable display layer 502 is mechanically coupled to a touch pad 504 in the manner described above. Touch pad 504 may be electrically coupled to a processor 506. Processor 506 may be coupled to a memory module 508 that may be used to store computer executable instructions or other data. In one embodiment, memory module 508 stores a handwriting recognition module that may be used by processor 506 to recognize characters written on touch pad 504. A keypad 510 and/or other conventional input device, such as a microphone or pointing device, may also be coupled to processor 506. Processor 506 may also be used to control a display driver 512 that is used to control the state of a display 514. Display 514 may correspond to display 102 shown in FIG. 1. Bistable display layer 502 may be controlled by driver circuit 516 that is coupled to processor 506. One skilled in the art will appreciate the differences between driver circuit 512 and driver circuit 516. In particular, driver circuit 516 may be much simpler and include fewer components because bistable display layer 502 does not require patterned electrodes. In one embodiment, the output of driver circuit 516 includes two terminals that may be coupled to two electrodes of bistable display layer 502.

Figure 6:
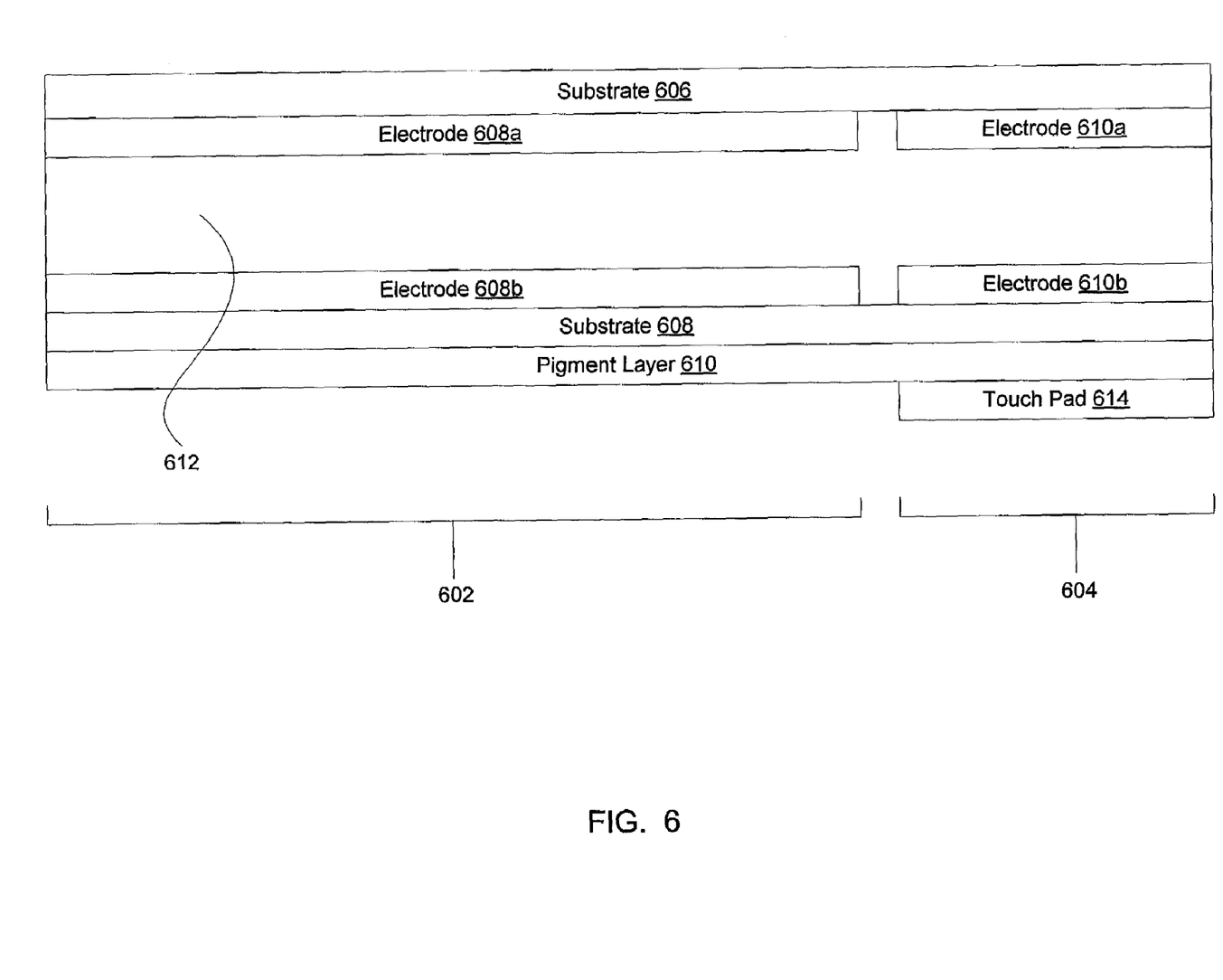
FIG. 6 shows a device having an integrated display and writing surface in accordance with an embodiment of the invention.

While the invention has been described with respect to specific examples including presently preferred modes of carrying out the invention, those skilled in the art will appreciate that there are numerous variations and permutations of the above described systems and techniques that fall within the spirit and scope of the invention. For example, FIG. 6 illustrates a device that includes an integrated display 602 and writing surface 604. Display 602 may be used to display information to a user in a conventional manner. Writing surface 604 may operate as described above. Display 602 and writing surface 604 may share a common upper substrate 606, lower substrate 608, pigment layer 610 and display layer 612. Display 602 utilizes electrodes 608a and 608b. Electrodes 608a and 608b may be patterned to address individual pixels in a conventional manner. In contrast to electrodes 608a and 608b, electrodes 610a and 610b may be sheet electrodes that are used to reset an entire writing surface section. Writing surface 604 may include a touch pad 614 positioned above substrate 606 or below substrate 608.

We claim:

1. An electronic device comprising:
a display layer comprising electrically and mechanically sensitive display material having at least two stable optical states, wherein each of the two stable optical states are maintained without the application of an electrical excitation, and wherein said layer changes optical states of a portion of said display material to create an image corresponding to mechanical pressure;
a touch pad physically coupled to the display layer, the touch pad configured to convert said mechanical pressure into an electrical output; and
a processor configured to cause said device to:
blank said display layer prior to receiving said mechanical pressure;
apply character recognition to said image;
display a corresponding character on a second output display in response to successful recognition of said image; and
remove said image from said portion of said display material at a predetermined amount of time after said successful recognition.

2. The device of claim 1, wherein the display material comprises liquid crystal material.

3. The device of claim 2, wherein the liquid crystal material comprises cholesteric liquid crystal material.

4. The device of claim 2, wherein the liquid crystal material comprises twisted nematic liquid crystal material.

5. The device of claim 2, wherein the display material comprises polymer dispersed throughout the liquid crystal material.

6. The device of claim 1, further including a flexible substrate located above the display layer.

7. The device of claim 6, further including a transparent electrode located between the flexible substrate and a first side of the display layer.

8. The device of claim 7, further including a reflective layer located below a second side of the display layer.

9. The device of claim 8, wherein the reflective layer comprises an electrode.

10. The device of claim 1, wherein the display material comprises a suspended particle material.

11. The device of claim 1, further including a driver module coupled to the display layer and configured to apply a field to reset the state of the display material.

12. The device of claim 11, wherein the field comprises an electric field.

13. The device of claim 11, wherein the field comprises a magnetic field.

14. The device of claim 1, wherein the display layer is positioned in an overlapping relationship with the touch pad.

15. The device of claim 1, further including an output display electrically coupled to the touch pad.

16. The input device of claim 15, wherein the output display comprises the display material.

17. The device of claim 1, further including a keypad.

18. An electronic device comprising:
an optical output section;
a mechanical input section comprising:
a display layer comprising electrically and mechanically sensitive display material having at least two stable optical states, wherein each of the two stable optical states are maintained without the application of an electrical excitation, and wherein said layer changes display states at locations where a passive stylus contacts said display layer during user input;
a transparent and flexible touch pad physically coupled to the display layer and positioned in an overlapping relationship with the display layer, the touch pad configured to convert mechanical pressure received by the display layer from a passive stylus into an electrical output; and
a processor configured to cause said device to:
display a prompt on said optical output section requesting said user input;
receive said user input via said passive stylus on said mechanical input section; and
display a corresponding character in said optical output section and apply a second blanking field to erase said display layer in response to recognizing said user input as a character.

19. The device of claim 18, further comprising: a key pad section comprising pressure sensitive keys.

20. The device of claim 18, wherein the optical output section comprises a display electrically coupled to the touch pad.

21. A mobile terminal comprising:
an output display; and
a mechanical input device comprising:
a display layer comprising electrically and mechanically sensitive display material having at least two stable optical states, wherein each of the two stable optical states are maintained without the application of an electrical excitation, wherein said layer changes display states at locations on said layer where mechanical pressure user input is received;
a touch pad physically coupled to the display layer, the touch pad configured to convert said mechanical pressure into an electrical output; and
a processor configured to cause said mobile terminal to:
display a prompt on said output display requesting user input;
apply a first blanking field to erase data from said display layer of said mechanical input device; and
display a corresponding character in said output display and apply a second blanking field to erase said display layer in response to recognizing said user input as a character.

22. The mobile terminal of claim 21, wherein the output display is integrated with the mechanical input device.

23. The mobile terminal of claim 22, wherein the output display comprises at least a portion of the display layer.

24. The mobile terminal of claim 21, wherein the display material comprises liquid crystal material.

25. The mobile terminal of claim 24, wherein the liquid crystal material comprises cholesteric liquid crystal material.

26. The mobile terminal of claim 24, wherein the liquid crystal material comprises twisted nematic liquid crystal material.

27. The mobile terminal of claim 21, further including a character recognition module coupled to the touch pad.

28. A method of operating an input device having an electrically and mechanically sensitive display layer having at least two stable optical states and physically coupled to a touch pad, the method comprising:
(a) receiving at the display layer and the touch pad a mechanical pressure;
(b) in response to (a) changing an optical state of the display layer and maintaining the optical state without applying an excitation to the display layer;
(c) at the touch pad, in response to (a), converting the mechanical pressure to an electrical output;
(d) performing character recognition to determine whether said mechanical pressure defined a character; and
(e) in response to successful character recognition, displaying a corresponding character on a second display area of said input device and applying a blanking field to reset said changed optical state of the display layer.

* * * * *